United States Patent
Benjamin et al.

(10) Patent No.: US 6,665,114 B2
(45) Date of Patent: Dec. 16, 2003

(54) HYBRID RAMAN-ERBIUM OPTICAL AMPLIFIER

(75) Inventors: Seldon D Benjamin, Painted Post, NY (US); Alan F Evans, Beaver Dams, NY (US); Stephen P Hegarty, Corning, NY (US); Ashiqur Rahman, Corning, NY (US)

(73) Assignee: Corning Incorporated, Corning, NY (US)

( * ) Notice: Subject to any disclaimer, the term of this patent is extended or adjusted under 35 U.S.C. 154(b) by 11 days.

(21) Appl. No.: 10/085,579

(22) Filed: Feb. 26, 2002

(65) Prior Publication Data
US 2003/0161031 A1 Aug. 28, 2003

(Under 37 CFR 1.47)

(51) Int. Cl.$^7$ .............. H01S 3/07; G02B 6/26
(52) U.S. Cl. .......... 359/334; 359/397.4; 372/3
(58) Field of Search .............. 359/334, 337.1, 359/337.4; 372/3

(56) References Cited

U.S. PATENT DOCUMENTS 6,310,716 B1 * 10/2001 Evans et al. .............. 359/334

FOREIGN PATENT DOCUMENTS

WO     WO 99/66607    * 12/1999

OTHER PUBLICATIONS

Masuda et al, Electronic Letters, vol. 34,#13. pp 2, Jun. 25, 1998.*
Takeda et al, OSA Tops, vol. 30, pp 101–105, 1999.*
Zou et al, IEEE Photonics Tech. Lett., vol. 8, #1, pp 139–141, Jan. 1996.*
Hawai et al, OFC '98 Tech Digest, pp 32–34, 1998.*

* cited by examiner

Primary Examiner—Nelson Moskowitz
(74) Attorney, Agent, or Firm—Svetlana Shot

(57) ABSTRACT

A hybrid optical signal amplifier is provided which includes the combination of a Raman amplifier and an EDFA assembly. The Raman amplifier has an output defined by regions of higher and lower gain levels, and the EDFA assembly has an output having a region, near the longer wavelengths thereof, that includes a maximum noise figure. The spectrum region of higher gain level of the Raman amplifier is selected to correspond to the spectrum region of the EDFA assembly that includes the maximum noise figure in order to lower the maximum noise figure of the resulting optical signal amplifier, as well as to flatten the gain across the output spectrum.

20 Claims, 3 Drawing Sheets

Raman gains used in comparison

—— Raman gain used to jointly optimise NF

- - - Raman gain used to separately optimise NF

HYBRID RAMAN-ERBIUM OPTICAL AMPLIFIER

FIELD OF THE INVENTION

This invention generally relates to optical amplifiers, and is specifically concerned with a hybrid Raman-erbium doped fiber amplifier (EDFA) that achieves a smaller maximum noise figure across its output spectrum than an individual EDFA of comparable gain.

BACKGROUND OF THE INVENTION

Erbium-doped fiber amplifiers (EDFAs) are used in optical transmission networks to extend transmission distances and to compensate for losses from various network elements. Such amplifiers typically comprise at least one pump laser whose output is optically coupled to the input of one or more serially connected coils of erbium-doped optical fiber. In operation, the output of the pump lasers excites the atoms of the erbium dopant within the serially connected coils. These excited atoms release their excess energy in proportion to the strength of the incoming optical signal, which results in an amplified output. While a single EDFA may be used in an optical network, an EDFA assembly comprising a pair of EDFAs connected by a dispersion-compensating module (DCM) is preferred as such an assembly provides higher gain with less dispersion-type distortion than a stand-alone EDFA.

Raman amplifiers are also used in optical transmission networks for the same purposes as EDFAs. In lieu of erbium-doped optical fiber, Raman amplifiers advantageously use standard optical fiber in achieving amplification. In such an amplifier, the output of a pair of orthogonally polarized pump-diode lasers provide backward propagating pump power in the transmission fiber. Forward-propagating signals achieve gain in the fiber because higher-energy (shorter wavelength) pump photons scatter off the vibrational modes of the optical fiber's lattice matrix and coherently add to the lower-energy (longer wavelength) signal photons. While the maximum gain levels that can be achieved with such Raman amplifiers are typically less than those achievable by EDFA amplifiers, Raman amplifiers are more economical since they require no specially doped optical fiber and can act as a low noise pre-amplifier before the EDFA.

In order to maximize the data through-put of an optical network, different optical signals are transmitted over different channels across a discrete portion of the optical spectrum. Such an optical spectrum may be, for example, the L-band window, which includes wavelengths of between 1570 to 1620 nm.

Ideally, the optical amplifiers in such networks should be able to amplify each channel within a selected transmission spectrum to the same level of gain. Stated differently, an ideal optical amplifier has a flat or uniform gain for all channels present across the output spectrum of the network. Such a flat gain output minimizes signal information losses throughout the network. By contrast, when the gain of an optical amplifier is non-uniform, signal information can ultimately be lost because of the progressive under-amplification of certain channels as they are propagated through the network. Ultimately, the inherent noise component present in such under-amplified channels overtakes and destroys the signal information.

One of the shortcomings of EDFAs is their non-flat gain characteristics across a given optical spectrum. In particular, the gain level is substantially less at the "red" end of the L-band between about 1600 and 1620 nm. Fortunately, the gain level of such amplifiers can be rendered substantially flat (i.e., with only about a 4% change at a 25 dB gain level) across the L-band window by the use of gain flattening filters which are optically coupled between the coils of erbium doped fiber. Unfortunately, the use of such filters results in a higher noise figure in the channels having wavelengths in the 1600–1620 nm range as illustrated in FIG. 1A. Here, the noise figure typically increases by approximately 33%. By contrast, the change in the noise figure in the channels within the 1570–1600 nm range of the spectrum is only about 3%. The substantially higher noise figure in the 1600–1620 nm range lowers the usable bandwidth available from such EDFA amplifiers.

Raman amplifiers likewise have non-flat gain characteristics. As illustrated in the graph of FIG. 1B, a typical Raman gain level curve has minimums at about 1570 nm, 1595 nm, and 1620 nm, and maximums at 1585 nm and 1610 nm. Gain can vary about 13% between the maximum and minimum points in the FIG. 1B example. A gain flattening filter can be applied to reduce this variation but will only be optimized at a single operating gain value. Additionally, there is the desire to minimize the number of gain flattening filters in the system and the loss they incur.

Clearly, there is a need for a bray to reduce the maximum noise figure in EDFA gain, as well as to further flatten the gain curve in Raman-type amplifiers in order to reduce signal losses throughout the network. Ideally, such noise figure reduction and gain flattening should be achieved without the use of additional gain flattening filters, which operate by reducing the gain of the most amplified channels to a level consistent with the lowest amplified channels throughout the output spectrum. Finally, it would be desirable if such noise figure reduction and gain flattening could be easily applied to optical amplifiers already in use in existing networks without the need for extensive modifications or new and expensive components.

SUMMARY OF THE INVENTION

The invention is a hybrid optical signal amplifier that reduces the maximum noise figure of an EDFA while flattening the gain of a Raman amplifier without compromising laser pump efficiency. To this end, the hybrid optical signal amplifier of the invention comprises a Raman amplifier having a gain level that varies across a spectrum of optical wavelengths and defines regions of higher and lower gain levels; an EDFA assembly having an input connected to an output of the Raman amplifier, and an output with a noise figure that varies across the same spectrum of optical wavelengths and defines a region that includes a maximum noise figure, wherein a spectrum region of higher gain level of the Raman amplifier corresponds to the spectrum region of the EDFA assembly that includes the maximum noise figure. The combination of a Raman amplifier and an EDFA assembly having such gain output characteristics advantageously reduces the maximum noise figure of the final output while providing a gain having less ripple than a stand-alone, ripple optimized Raman amplifier.

While the invention encompasses the concept of an EDFA assembly in combination with a Raman amplifier which has had its output ripple individually optimized, a more preferred embodiment of the invention is the combination of an EDFA assembly and a Raman amplifier whose gain ripple has been adjusted to maximally reduce the region of highest noise figure in the output spectrum of the EDFA assembly to optimize the output of the hybrid amplifier. To this end, either or both of the EDFA assembly or the Raman amplifier may includes an optical filter for optimally flattening the gain spectrum of the hybrid optical signal amplifier.

The EDFA assembly may include a pair of EDFAs serially connected via a dispersion compensating module. Such an arrangement efficiently provides a higher level of distortion free gain over the output spectrum than the use of a single stage EDFA.

In the preferred embodiment of the hybrid optical signal amplifier, the magnitude of the maximum noise figure is less than 2.0 dB, and even more preferably less than 1.5 dB. Additionally, the wavelength spectrum for both the gain and noise figure is preferably between 1400 and 1750 nm, and more preferably in the L-band between about 1570 and 1630 nm.

The invention provides a higher and more noise-free and less ripple distorted output than is normally achieved by the use of either a stand-alone EDFA assembly or Raman amplifier.

DETAILED DESCRIPTION OF THE INVENTION

Figure 2:
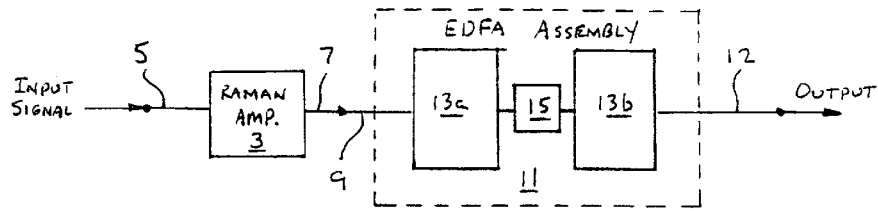
FIG. 2 is a schematic of the hybrid optical signal amplifier of the invention.

With reference now to FIG. 2, wherein like figures designate like components throughout all of the several figures, the hybrid optical signal amplifier 1 of the invention generally comprises a Raman amplifier 3 serially connected to the input of an EDFA assembly 11 as shown. The Raman amplifier 3 has an input 5 for receiving incoming optical signals and an output 7 connected to an input 9 of the EDFA assembly 11. In the preferred embodiment, EDFA assembly 11 includes first and second amplifier stages 13a, b serially connected via a dispersion compensating module (DCM) 5. Each of the amplifier stages 13a, b may be, for example, an EDFA manufactured by Corning, Incorporated, located in Corning, N.Y. Similarly, the dispersion compensating module 15 may be one manufactured by Corning, Incorporated. While the EDFA assembly 11 of the preferred embodiment is preferably formed from an EDFA-DCM-EDFA configuration as shown for enhanced amplification efficiency, the invention would also work if the EDFA assembly 11 consisted of only a single EDFA amplification stage such as the one illustrated in FIG. 4.

Figure 3:
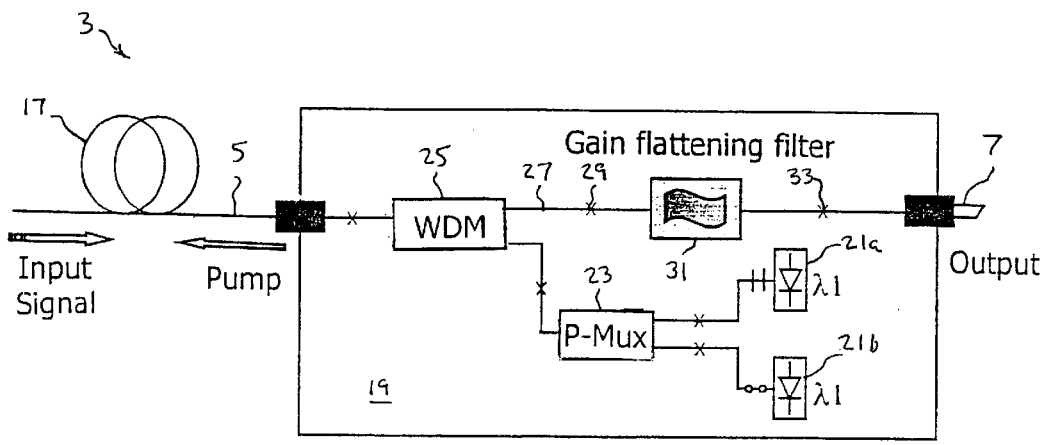
FIG. 3 is a schematic of the Raman amplifier component of the hybrid amplifier.

With reference now to FIG. 3, the Raman amplifier 3 of the invention may comprise a length of gain fiber 17 (which is advantageously a length of transmission fiber in an optical network) in combination with a pump assembly 19. The pump assembly 19 includes a pair of pump laser diodes 21a, b. The output of the pump lever diodes 21a, b are connected to a polarization multiplexer 23 which in turn generates a polarity neutral (i.e., unpolarized) pump signal that advantageously prevents polarization dependent gain in different signal channels. The output of the polarization multiplexer 23 is transmitted to a wave division multiplexer 25 which couples the pump output into the length of gain fiber 17. In operation, the pump output is propagated backwards through the gain fiber 17. Because the pump power has a shorter wave length (i.e., 1400 nm to 1500 mn) than the forward propagating signals transmitted through the gain fiber 17 (which are between 1570 and 1620 nm), the shorter wavelength pump photons scatter off the vibrational modes of the lattice matrix forming the gain fiber and coherently add to the longer wavelength and lower energy signal photons. The amplified signal of the Raman amplifier 3 follows the same direction as the input signal and is transmitted over the wave division multiplexer 25 through fiber 27.

Figure 1A:
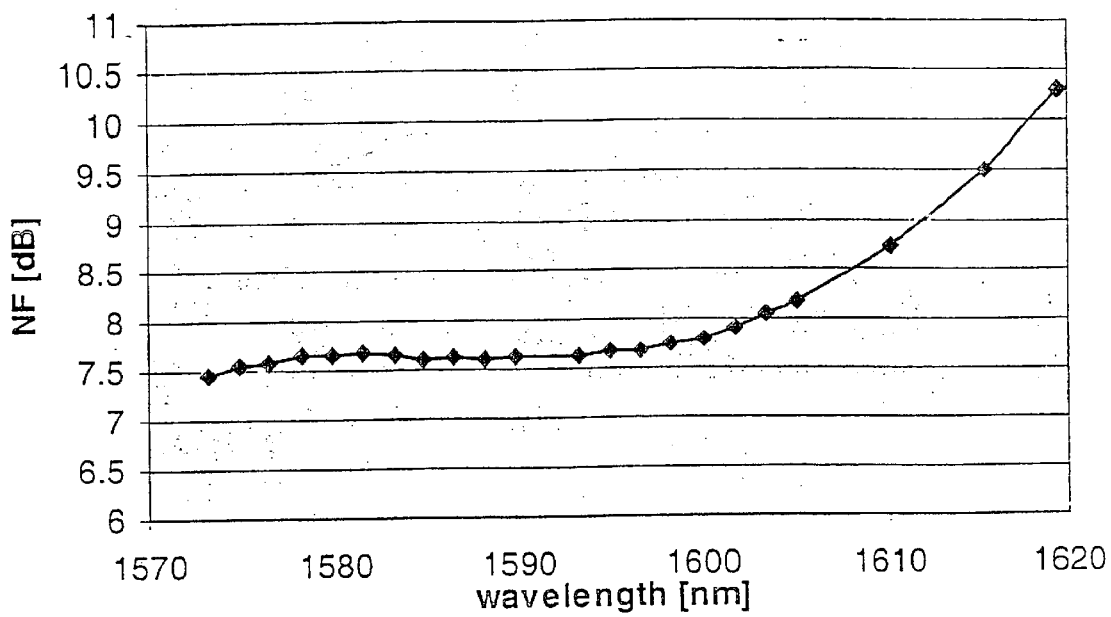
FIG. 1A is a graph illustrating the noise figure of a typical EDFA assembly in the L-band.
Figure 1B:
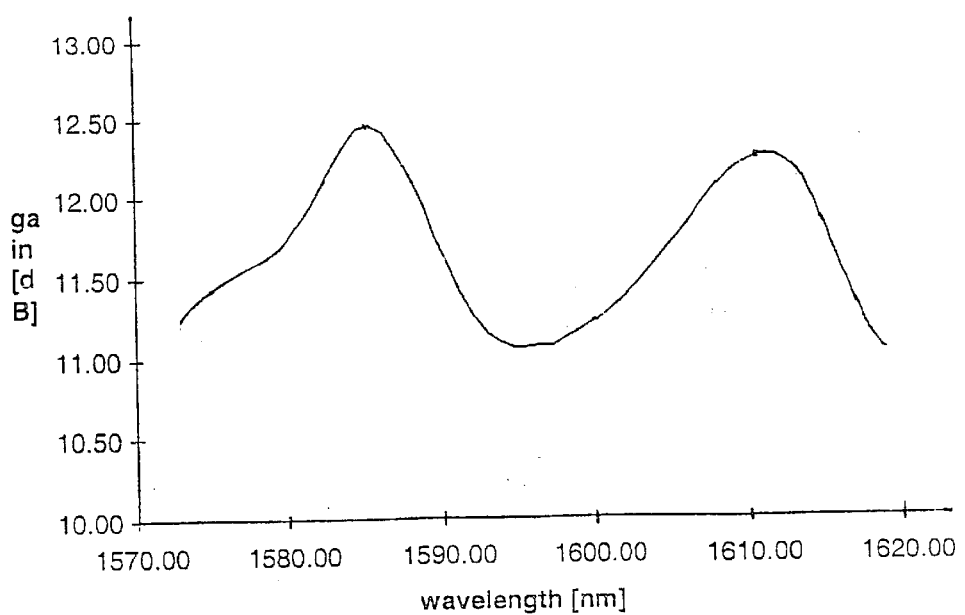
FIG. 1B is a graph of the gain spectrum of a typical Raman amplifier in the L-band which has been individually optimized through the use of optical filters such as gain flattening filters.

In order to help compensate for wavelength-dependent variations in the gain achieved by the amplifier 3, a gain flattening filter 31 is spliced into the transmission fiber 27 via splice connections 29 and 33. Normally, the optical properties of the gain flattening filter 31 are chosen so as to minimize unwanted "ripple" or non-flatness in the gain of the Raman amplifier over the spectrum of its transmission wavelengths. However, a more preferred embodiment maintains this gain shape through part of the EDFA before being corrected in with a single gain flattening filter within the EDFA. An example of an uncorrected gain output is illustrated in the previously-discussed FIG. 1B. While the invention encompasses the use of Raman amplifiers having gain flattening filters designed to optimize gain ripple of each amplifier individually, the preferred embodiment of the invention utilizes a single gain flattening filter that optimizes the output characteristics of the hybrid amplifier, as will be discussed in more detail with respect to FIG. 6. While the pump assembly 19 may be, a pump assembly manufactured by Corning, Incorporated, any type of Raman amplifier may be used in the invention so long as the output of such a Raman amplifier includes a region of relatively high amplification that corresponds to the highest noise region in the output spectrum of the EDFA assembly.

Figure 4:
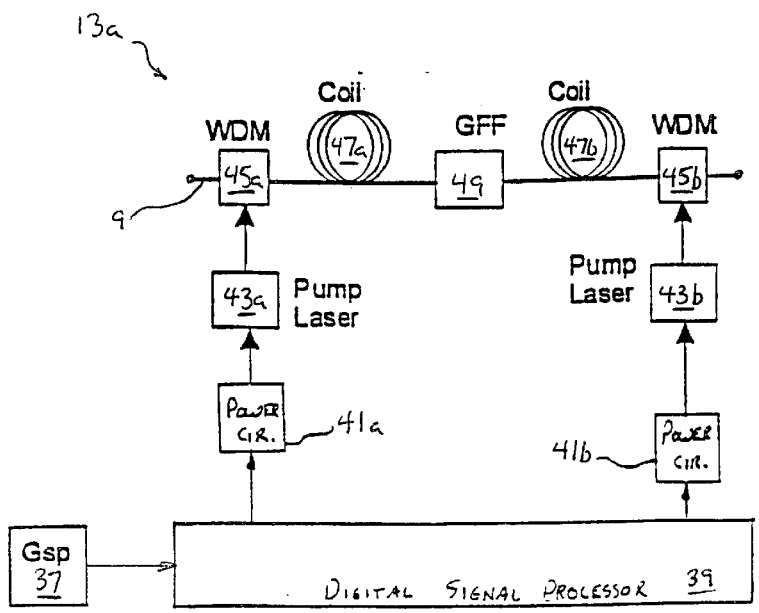
FIG. 4 is a schematic of one of the amplifier stages of the EDFA assembly that forms the second component of the hybrid amplifier.

With reference now to FIG. 4, each of the amplifier stages 13a, b of the EDFA assembly 11 includes a gain setpoint circuit 37 connected to a digital signal processor 39. The digital signal processor 39 is in turn connected to a pair of power circuits 41a, b which power a pair of pump lasers 43a, b. The output of each of the pump laser 43a, b is coupled into an erbium-doped amplification coil 47a, b via a wave division multiplexer 45a, b. A gain flattening filter 49 is optically coupled between the two erbium-doped amplification coils 47a, b in order to flatten the gain characteristics across the output wavelength spectrum of the EDFA. The gain flattening filter 49 used in each amplification stage of an EDFA assembly typically achieves a flat gain across the output spectrum of the EDFA to within a factor of approximately 4% at a 25 dB gain. This would be a preferred location of a single gain flattening filter to reduce the combined variation in the output spectrum of the hybrid amplifier either within EDFA 13a or 13b. A single gain flattening filter could also be placed in between EDFAs 13a and 13b. In operation, the system operator preselects a desired gain level by way of the gain setpoint circuit 37. The gain setpoint circuit 37 in turn transmits an electrical signal to the digital signal processor 39 indicative of the desired gain of the EDFA. In response to the signal received by the gain setpoint circuit 37, the digital signal processor 39 adjusts the amount of power that each of the power circuits 41a, b conducts to the pump lasers 43a, b. As the amplitude of the gain is dependent upon the amplitude of the light transmitted by the pump lasers 43a, b, the resulting gain is generated in accordance with the gain level selected by the system operator.

Figure 5:
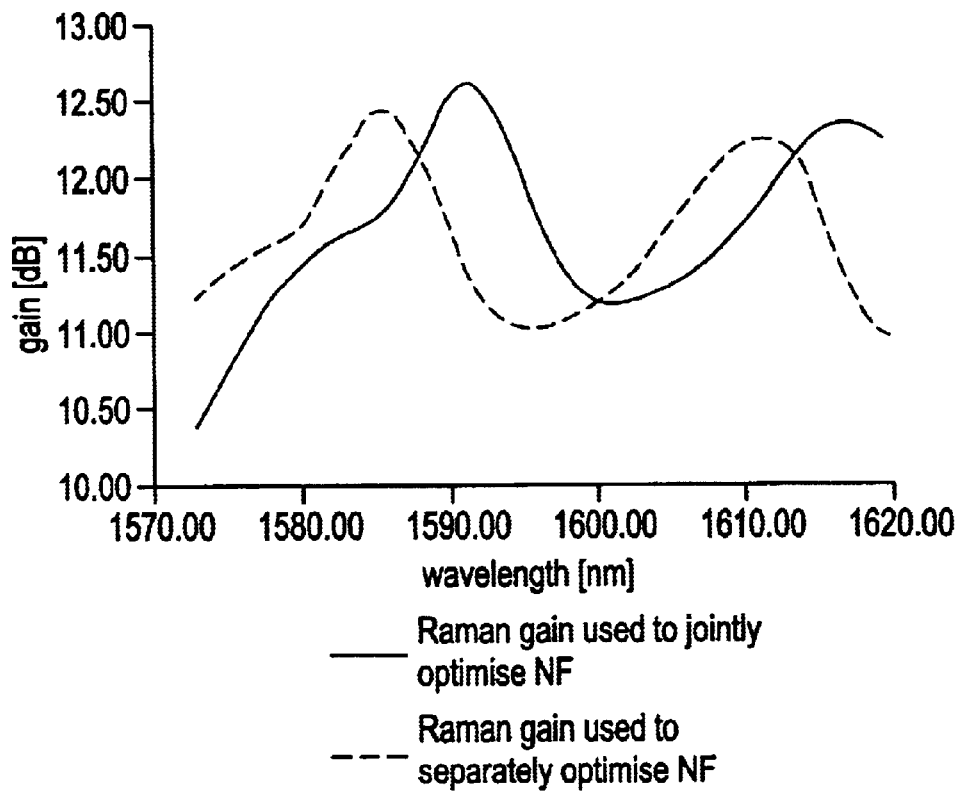
FIG. 5 compares the gain spectrum of a Raman amplifier whose gain has been separately optimized to eliminate ripple versus a Raman amplifier whose gain has been optimized to maximally reduce the region of highest noise figure in an EDFA assembly.
Figure 6:
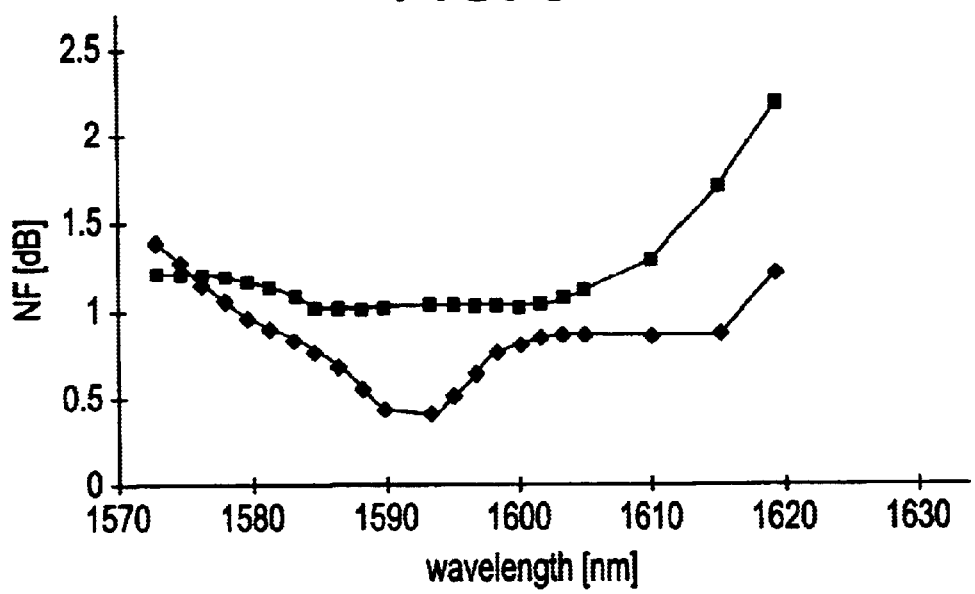
FIG. 6 illustrates the gain spectrums in the L-band of a hybrid amplifier where the output of the Raman amplifier component has been individually optimized to reduce ripple (indicated by squares) versus a Raman amplifier component whose output has been optimized to maximally reduce the noise figure of the EDFA assembly in the hybrid amplifier (indicated by rhombuses).

FIGS. 5 and 6 compare the relative advantages of the invention in an embodiment in which the Raman amplifier 3 is designed to separately optimize its gain characteristics versus a Raman amplifier having a gain shape designed to jointly optimize the noise figure the hybrid amplifier 1. In particular, FIG. 5 illustrates the gain output of an Raman amplifier operating in the L-band between 1570 and 1620 nm in which the pump powers and wavelengths have been designed to separately flatten the gain of the Raman amplifier (illustrated as dotted line) versus pump powers and wavelengths designed to optimize the noise figure in combination with an EDFA assembly (shown as a solid line). The most important difference between these two outputs is the fact that the output of the jointly optimized Raman amplifier has higher gain characteristics in the form of a local maximum near the "red" end of the output spectrum between 1610 and 1620 nm. It is also important to note that the total pump power and average gain is nearly the same in each curve. This means that pump efficiency defined as Raman gain divided by pump power is constant so that pump costs are unaffected by the design.

Because this local maximum of gain corresponds more directly with the maximum noise figure region in an EDFA assembly (see FIG. 1A), the resulting output of a hybrid amplifier has an advantageously lower maximum noise figure, as illustrated by the graphs of FIG. 6. Here, the graph formed by the squares represents the noise figure across the output spectrum of a combined Raman/EDFA assembly hybrid amplifier where the Raman pumps have been chosen only to optimize its own output independent of the subsequent EDFA. Note how this noise figure ranges between approximately 1 and 2.5 dB. By contrast, in a hybrid amplifier wherein the Raman pumps have been designed to jointly optimize the noise figure, the maximum noise figure is only 1.25 dB, and actually drops below 0.5 dB between 1590 and 1595 nm. Accordingly, the most preferred embodiment of the invention includes a Raman amplifier having pump powers and wavelengths that jointly optimizes the noise figure output in accordance with the rhombus graph of FIG. 6.

While this invention has been described with respect to a preferred embodiment, various modifications and additions may be made without departing from the scope of the invention. For example, the optimized noise figure output illustrated by the rhombuses in FIG. 6 might also be obtained with more than two Raman pump wavelengths. Additionally the location of gain flattening filters that corrects the combined Raman and EDFA spectrum could be different than specified. Finally, other optical components such as variable optical attenuators (VOA) may be used in lieu of gain flattening filters in order to achieve optimized results. All such modifications, variations, and additions are within the scope of this invention, which is limited only by the claims appended hereto.

PARTS LIST

1. Hybrid optical signal amplifier
3. Raman amplifier
5. Input
7. Raman amplifier output
9. EDFA input
11. EDFA assembly
12. EDFA output
13. First, second amplifier stages a, b
15. Dispersion compensating module
17. Gain fiber
19. Pump assembly
21. Pump laser diodes a, b
23. Pump polarziation multiplexer
25. Wave division multiplexer
27. Transmission fiber
29. Connection splice
31. Gain flattening filter
33. Connection splice
37. Gain setpoint circuit
39. Digital signal processor
41. Power circuits a, b
43. Pump lasers a, b
45. Wave division multiplexers a, b
47. Erbium-doped fiber coils a, b
49. Gain flattening filter
50. Output

What is claimed is:

1. A hybrid optical signal amplifier, comprising:
   a Raman amplifier having an output with a gain level that varies across a spectrum of optical wavelengths and defines regions of higher and lower gain levels;
   an EDFA assembly having an input connected to said Raman amplifier output, and an output with a noise figure that varies across said spectrum of optical wavelengths and defines a region including a maximum noise figure,
   wherein a spectrum region of higher gain level of said Raman amplifier overlaps said spectrum region of said EDFA assembly including said maximum noise figure such that said maximum noise figure of said hybrid amplifier is lowered, wherein the magnitude of said maximum noise figure is less than 5 dB.

2. The hybrid optical signal amplifier according to claim 1, wherein said higher gain output of the gain output spectrum of said Raman optical amplifier is substantially complementary to said region of said noise figure spectrum of said EDFA assembly.

3. The hybrid optical signal amplifier according to claim 1, further comprising an optical filter for optimally flattening a combined gain spectrum of said Raman amplifier and said EDFA assembly.

4. The hybrid optical signal amplifier according to claim 1, wherein both said Raman and EDFA assembly amplifiers include an optical filter for optimally flattening a noise figure spectrum of said hybrid optical signal amplifier.

5. The hybrid optical signal amplifier according to claim 1, wherein said EDFA assembly includes a dispersion compensating module.

6. The hybrid optical signal amplifier according to claim 5, wherein said EDFA assembly includes two erbium doped fiber amplifiers connected by said dispersion compensating module.

7. The hybrid optical signal amplifier according to claim 1, wherein said Raman amplifier includes two orthogonally polarized pump lasers and a polarization multiplexer to provide a polarity neutral pump signal.

8. The hybrid optical signal amplifier according to claim 1, wherein the magnitude of said maximum noise figure is less than 2.0 dB.

9. The hybrid optical signal amplifier according to claim 1, wherein the magnitude of said maximum noise figure is less than 1.5 dB.

10. The hybrid optical signal amplifier according to claim 1, wherein said wavelength spectrum is defined between 1400 and 1750 nm.

11. A hybrid optical signal amplifier, comprising:
a Raman amplifier having an output with a gain level that varies across a spectrum of optical wavelengths and includes at least one region having a local maximum gain;
an EDFA assembly having an input connected to said Raman amplifier output and a noise figure that varies across said spectrum of optical wavelengths and includes a region having a maximum noise figure,
wherein said region of local maximum gain of said Raman amplifier corresponds to said region having said maximum noise figure of said EDFA such that said maximum noise figure of said hybrid amplifier is lowered below 5 dB.

12. The hybrid optical signal amplifier according to claim 11, further comprising an optical filter for optimally flattening a combined gain spectrum of said Raman amplifier and said EDFA assembly.

13. The hybrid optical signal amplifier according to claim 12, wherein both said Raman and EDFA assembly amplifiers include an optical filter for optimally flattening a noise figure spectrum of said hybrid optical signal amplifier.

14. The hybrid optical signal amplifier according to claim 11, wherein said EDFA assembly includes a dispersion compensating module.

15. The hybrid optical signal amplifier according to claim 14, wherein said EDFA assembly includes two erbium doped fiber amplifiers connected by said dispersion compensating module.

16. The hybrid optical signal amplifier according to claim 11, wherein said Raman amplifier includes two orthogonally polarized pump lasers and a polarization multiplexer to provide a polarity neutral pump signal.

17. The hybrid optical signal amplifier according to claim 11, wherein the magnitude of said maximum noise figure is less than 1.5 dB.

18. The hybrid optical signal amplifier according to claim 11, wherein said wavelength spectrum is defined between 1570 nm and 1620 nm.

19. The hybrid optical signal amplifier according to claim 12, wherein said EDFA assembly includes two erbium dopes fiber amplifiers, and said optical filter is optically coupled between said amplifiers.

20. The hybrid optical signal amplifier according to claim 16, wherein said pump lasers generate a plurality of different pump wavelengths.

* * * * *